United States Patent
Chang

(10) Patent No.: US 7,193,424 B2
(45) Date of Patent: Mar. 20, 2007

(54) ELECTRICAL SCANNING PROBE MICROSCOPE APPARATUS

(75) Inventor: Mao-Nan Chang, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 11/121,102

(22) Filed: May 4, 2005

(65) Prior Publication Data
US 2005/0269510 A1 Dec. 8, 2005

Related U.S. Application Data

(63) Continuation-in-part of application No. 10/861,385, filed on Jun. 7, 2004, now Pat. No. 6,975,129.

(51) Int. Cl.
*G01R 31/02* (2006.01)
(52) U.S. Cl. .................................................... 324/762
(58) Field of Classification Search ............... 324/765, 324/761–762, 158.1, 750–752; 250/559.3, 250/559.44, 306–307
See application file for complete search history.

(56) References Cited

U.S. PATENT DOCUMENTS

| | | | |
|---|---|---|---|
| 5,464,977 A * | 11/1995 | Nakagiri et al. | 250/234 |
| 5,517,128 A * | 5/1996 | Henninger | 324/765 |
| 5,523,700 A * | 6/1996 | Williams et al. | 324/765 |
| 5,550,479 A * | 8/1996 | Wakana et al. | 324/758 |
| 6,127,506 A | 10/2000 | Greene | |
| 6,404,207 B1 | 6/2002 | Bhushan | |
| 6,466,537 B1 * | 10/2002 | Kasama et al. | 369/126 |
| 6,788,086 B2 | 9/2004 | Hantschel et al. | |

FOREIGN PATENT DOCUMENTS

JP  2000-146810 A  5/2000

OTHER PUBLICATIONS

G.H. Buh et al. "Factors influencing the capacitance-voltage characteristics measured by the scanning capacitance microscope" Journal of Applied Physics; (2003), 94(4), p. 2680-2685.
M.N. Chang et al. "Photovoltaic effect on differential capacitance profiles of low-energy- $BF^+2$-implanted silicon wafers" Applied Physics Letters; (2003), 82(22), p. 3955-3957.

* cited by examiner

*Primary Examiner*—Ha Tran Nguyen
*Assistant Examiner*—Tung X. Nguyen
(74) *Attorney, Agent, or Firm*—Birch, Stewart, Kolasch & Birch, LLP

(57) ABSTRACT

An electrical scanning probe microscope (SPM) apparatus. The SPM apparatus is equipped with an atomic force microscope with an infrared laser source, a position-sensitive photo-detector (PSPD) to provide a topographic image, a charge-coupled device (CCD) monitor for optical alignment, and an electrical scanning sensor operatively coupled to the atomic force microscope to acquire synchronous two-dimensional electrical images. The photoperturbation effects induced by stray light and perturbation of the contrast of SCM images can thus be ameliorated.

7 Claims, 8 Drawing Sheets
(2 of 8 Drawing Sheet(s) Filed in Color)

ELECTRICAL SCANNING PROBE MICROSCOPE APPARATUS

CROSS-REFERENCE TO RELATED APPLICATIONS

This is a continuation-in-part of application Ser. No. 10/861,385, filed on Jun. 7, 2004 now U.S. Pat. No. 6,975,129, the teachings of which are incorporated herein by reference.

BACKGROUND OF THE INVENTION

1. Field of the Invention

The invention relates to an electrical scanning probe microscope apparatus, and more particularly to an electrical scanning probe microscope apparatus comprising an atomic force microscope equipped with a long-wavelength laser source.

2. Description of the Related Art

Scanning probe microscopes (SPMs) providing very high resolution images of various surface properties are typically employed as a means of measuring surface topography and corresponding electrical property analysis. Different types of electrical properties can be measured such as, conductivity, voltage, capacitance, resistivity, current, and others. Accordingly, many different SPM techniques may be used when measuring electrical properties. For example, SPM techniques that may be used for synchronously providing electrical signals corresponding to topographic images comprise scanning capacitance microscopy (SCM), scanning spreading resistance microscopy (SSRM), Kelvin force microscopy (KFM) and conductive atomic force microscopy (C-AFM).

The scanning capacitance microscope (SCM) apparatus works by scanning a tiny tip over the surface of a sample being imaged, while synchronously measuring the electrical properties of the sample. A typical SCM apparatus comprises an atomic force microscope (AFM) and an ultra-high frequency (UHF) resonant capacitance sensor can synchronously provide a two-dimensional image. The AFM acquires surface topographic images, and the UHF resonant capacitance sensor provides a synchronous two dimensional differential capacitance images. The AFM typically comprises a cantilever and a conductive probe at the free end of the cantilever. In most AFMs the position of the cantilever is detected with optical techniques. A red laser beam (670 nm) reflected off the back of the cantilever onto a position-sensitive photo-detector is adapted to detect the position of the cantilever. The AFM can thus generate topographic images. However, photoperturbations, such as the photovoltaic effect and the high-level carrier injection effect induced by stray light of the AFM red laser beam lead to distorted differential capacitance (dC/dV) profiles and hence perturb the contrast of SCM images.

According to recent research, narrow band-gap semiconductors, such as Si, GaAs, InP or others, suffer from the aforementioned photoperturbations. The photoperturbations induced by the AFM laser beam not only affect the image contrast of SCM images, but also reduce the accuracy of the determination of the carrier concentration distribution. Solutions to these problems have been long sought but thus far have eluded those skilled in the art.

SUMMARY OF THE INVENTION

Accordingly, an object of the present invention is to provide an electrical scanning probe microscope apparatus comprising an atomic force microscope equipped with a long-wavelength laser to overcome the photoperturbation effects and improve the accuracy of junction images, in particular for ultra-shallow junctions in the narrower band-gap semiconductors.

In order to achieve the above objects, the present invention provides an electrical scanning probe microscope apparatus, comprising: an atomic force microscope with an infrared laser source and a position-sensitive photo-detector (PSPD) to provide a topographic image; a charge-coupled device (CCD) monitor for optical alignment; and an electrical sensor device operatively coupled to the atomic force microscope to form a synchronous two-dimensional electrical image. The PSPD comprises an InGaAs or a Ge PIN photodiode.

In order to achieve the above objects, the present invention provides an electrostatic force microscope apparatus, comprising: an atomic force microscope with an infrared laser source and a position-sensitive photo-detector (PSPD) to provide a topographic image; wherein a synchronous two-dimensional electrical potential image is acquired corresponding with the topographic image.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The present invention can be more fully understood by reading the subsequent detailed description in conjunction with the examples and references made to the accompanying drawings, wherein.

DETAILED DESCRIPTION OF THE INVENTION

The present invention will be described with respect to preferred embodiments in a specific context, namely in a scanning capacitance microscope (SCM) apparatus. The invention may also be applied, however, to other applications, such as scanning spreading resistance microscopes (SSRM), Kelvin force microscopes (KFM) and conductive atomic force microscopes (C-AFM).

Figure 1:
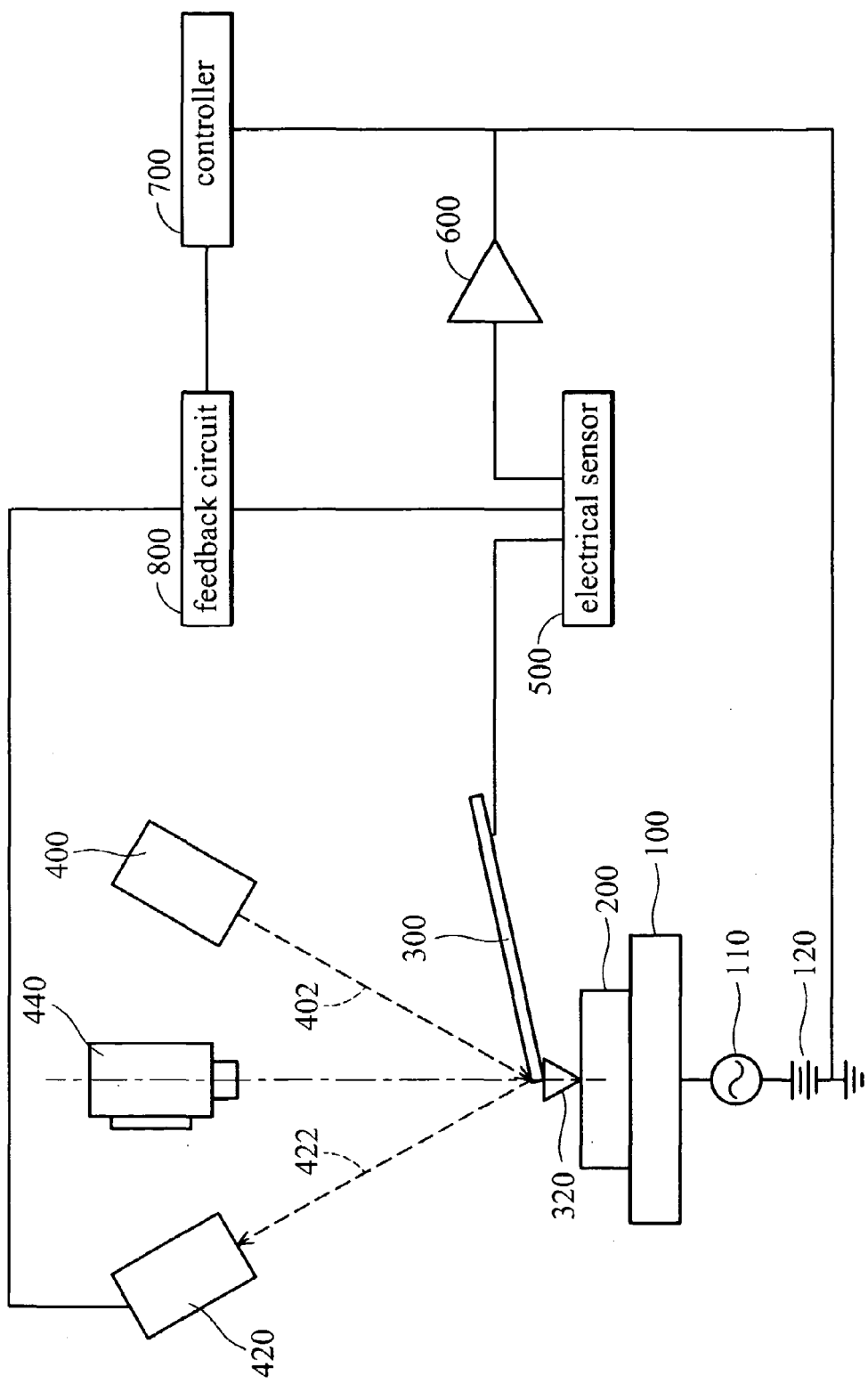
FIG. 1 is a functional block diagram of an electrical scanning probe microscope apparatus according to an embodiment of the present invention.

FIG. 1 is a functional block diagram of an electrical scanning probe microscope (SPM) apparatus according to an embodiment of the present invention. The (SPM) apparatus comprises an atomic force microscope with a long-wavelength laser as a surface image measuring setup to provide a topographic image and an electrical scanning sensor device to synchronously provide a two-dimensional electrical image. The electrical scanning sensor device comprises a capacitance sensor, a spreading resistance sensor, or a current sensor. The atomic force microscope is equipped with a long-wavelength laser source as a surface morphology image measuring setup. The wavelength of the laser source exceeds 670 nm, and more preferably equals 1.3 or 1.55 μm. The electrical scanning sensor device can provide two-dimensional differential capacitance images.

Referring to FIG. 1, an electrical scanning probe microscope (SPM) apparatus comprises a sample stage 100 for supporting a sample 200 and controlling the position of the sample 200. An AC biasing source 110 and a DC bias 120 are operatively coupled to the sample stage 100. A scanning probe device comprises a cantilever 300 and a conductive probe 320. The conductive probe 320 moves toward and away from the surface of sample 200 with oscillatory motion, preferably at or near a resonant frequency of the scanning probe device. Conductive probe 320 is operatively coupled to an electrical sensor 500, such as a UHF capacitance sensor, a spreading resistance sensor, or a current sensor. From electrical sensor 500, modulated capacitance signals pass to lock-in amplifier 600. Preferably, a UHF-resonant capacitance sensor detects the capacitance between conductive probe 320 and sample 200. Alternatively, a capacitive bridge circuit or an impedance transformer may be used instead of sensor 500.

In the most common configuration, a long-wavelength laser source 400, such as laser diode, generates a laser beam 402 which bounces off the back of the cantilever 300 onto a position-sensitive photo-detector (PSPD) 420, such as an InGaAs or a Ge PIN photodiode. As the cantilever 300 bends, the position of the laser beam 402 on the detector 420 shifts. A calibration device 440, such as a charge-coupled device (CCD) monitor, calibrates the position of the laser beam 402.

Lock-in amplifier 600 demodulates the capacitance signals at the oscillation frequency, or at some combination of frequency oscillation harmonics, of conductive probe 320, resulting in signals that correspond to the modulation amplitude of the probe-sample capacitance. These signals pass to a controller 700, and then pass into an AFM feedback circuit 800 to be stored for each data point with respect to X and Y position on sample 200. Such data may also be passed to a display device (not shown) for display as an image of sample capacitance or topography. The operations and functions of the AFM may be referred to U.S. Pat. No. 6,127,506 which is fully incorporated by reference herein.

Figure 2:
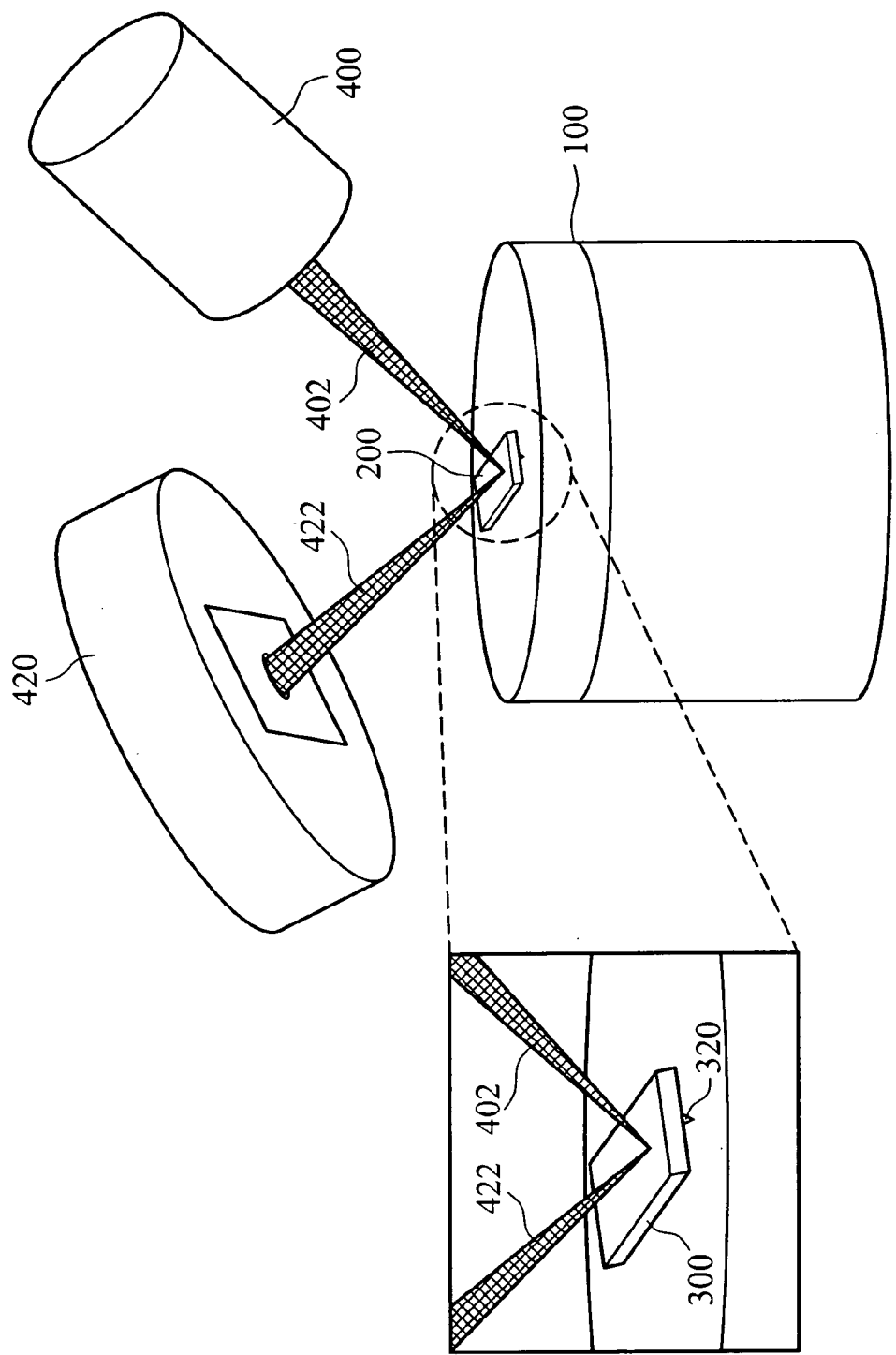
FIG. 2 is a partial schematic view of an electrical scanning probe microscope apparatus using a long-wavelength laser beam as a surface image measuring setup.

FIG. 2 is a partial schematic view of an AFM detecting the position of the cantilever with long-wavelength laser optical techniques. A long-wavelength, such as 1.3 or 1.55 μm, laser beam 402 bounces off the back of the cantilever 300 onto a position-sensitive photo-detector (PSPD) 420. The long-wavelength laser source 400 comprises laser diode with excellent electro-optical performance equipped with a thermo-electric cooler (TEC) to cool the operating temperature.

An operative embodiment is provided illustrating the influence of the photoperturbations on measured differential capacitance (dC/dV) signals for a low-energy-$BF_2^+$-implanted silicon substrate. A <100> n-type silicon substrate is provided. A silicon oxide layer of 25 nm in thickness is thermally grown on the substrate. The substrate doping level is approximately $5\times10^{15}$ atom/$cm^3$. The oxide layer is patterned with standard photolithography and reactive ion etching processes to form a grating pattern. The grate and spacing widths are 0.8 and 2 μm respectively. The resultant substrate is implanted with $BF_2^+$ ions at an energy of 20keV and ion dosage of $5\times10^{14}cm^{-2}$. RTA treatments of the implanted substrate are then performed at 1050° C. for 30 sec in an $N_2$ ambient to form $p^+$-n junctions. After RTA processes, a plasma-enhanced tetra-ethyl-ortho-silicate (TEOS) layer of 500 nm in thickness is deposited on the substrate. A low-energy-$BF_2^+$-implanted silicon substrate is thus formed.

In accordance with the present invention, the synchronous SCM images are acquired using a contact mode AFM. The cantilever of the conductive probe of the AFM is approximately 200–450 μm long, 30–50 μm wide and 5 μm thick. The contact force of the conductive force is lower than a nanonewton.

Figure 3A:
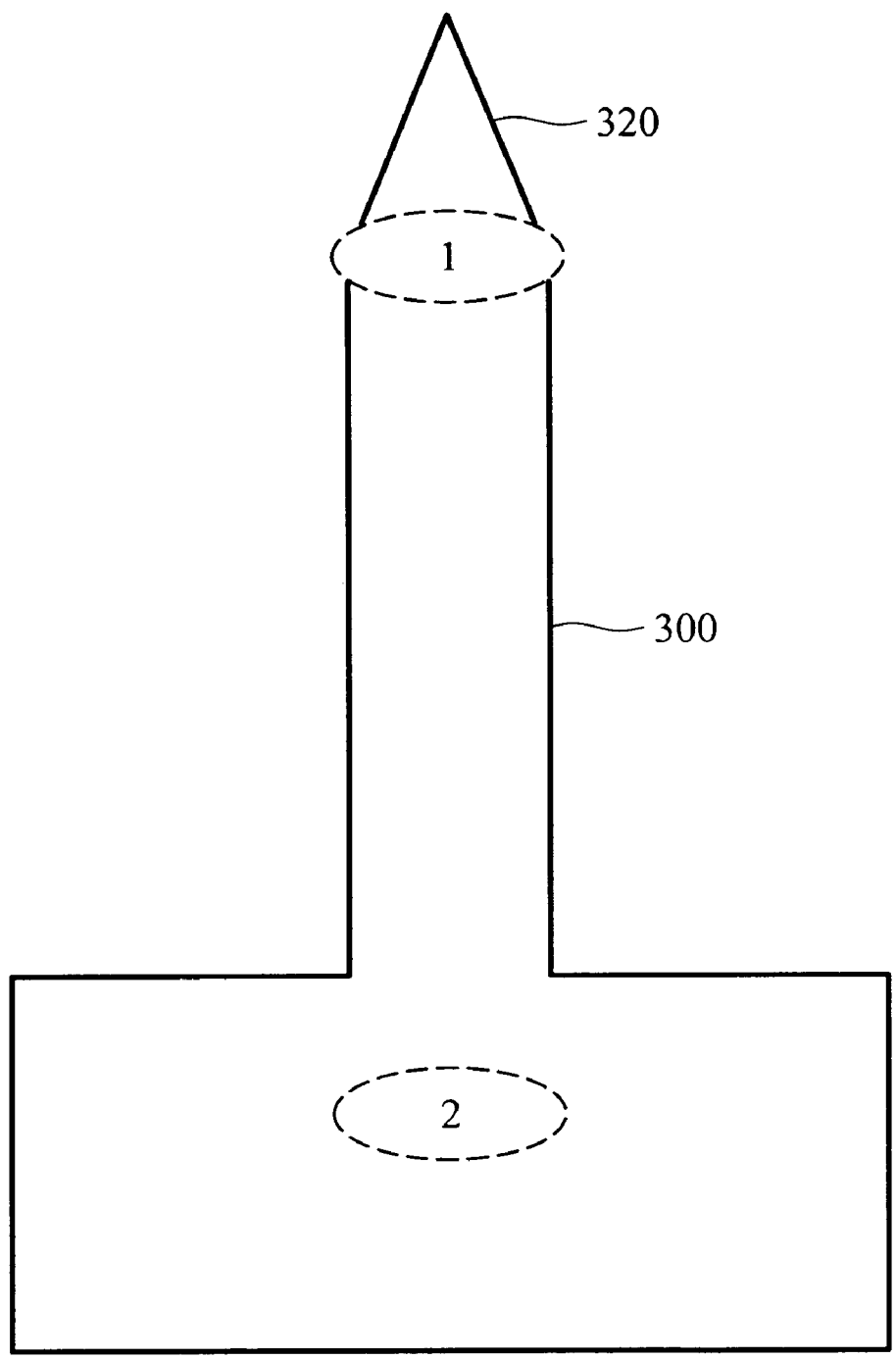
FIGS. 3A–3C are schematic views of an AFM laser beam aligned at different points on the cantilever.
Figure 3B:
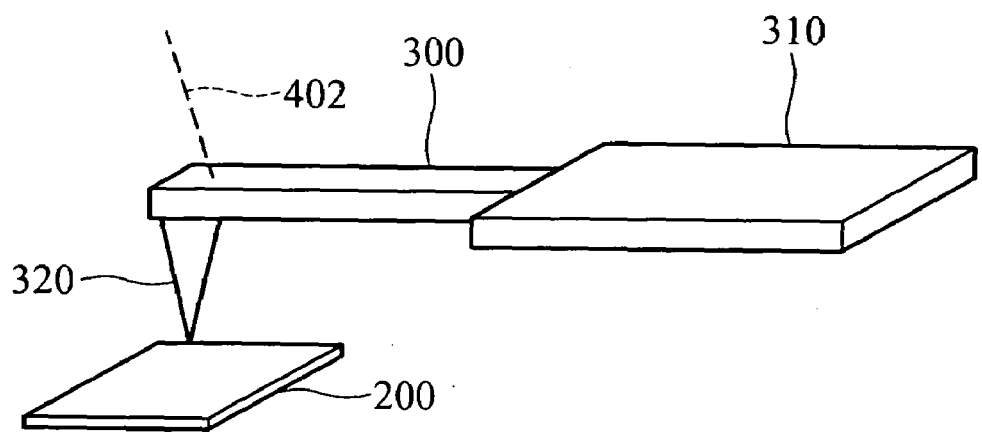
Figure 3C:
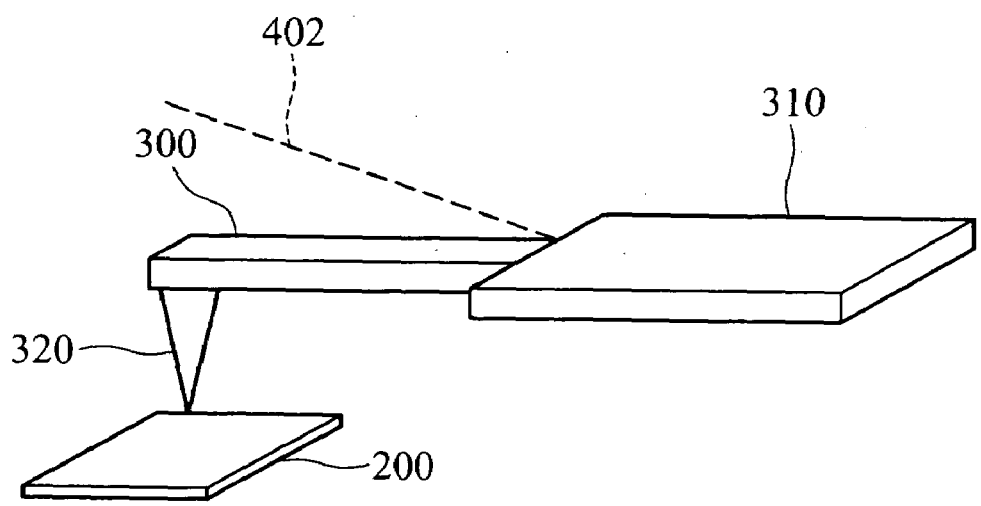

FIG. 3A is schematic view of an AFM laser beam aligned at different points on the cantilever. The AFM laser beam is aligned on the tip site (setup 1) for acquiring the AFM image to confirm the surface conditions and to obtain the cantilever height as a reference for later SCM measurements as shown in FIG. 3B. A first corresponding SCM image is acquired by setup 1. The AFM laser beam is aligned on the cantilever (setup 2) by using previously obtained cantilever height to produce lower stray light intensity on the scan region as shown in FIG. 3C. A second corresponding SCM image is acquired by setup 2.

Figure 4A:
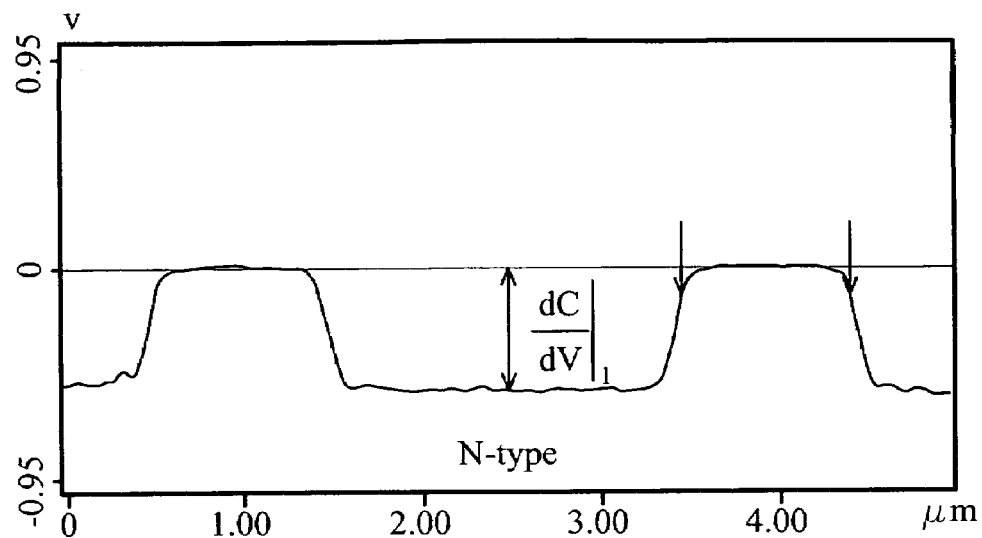
FIGS. 4A and 4B are differential capacitance (dC/dV) profiles of the low-energy-$BF_2^+$-implanted region with different AFM laser beam setups shown in FIGS. 3B and 3C, respectively.
Figure 4B:
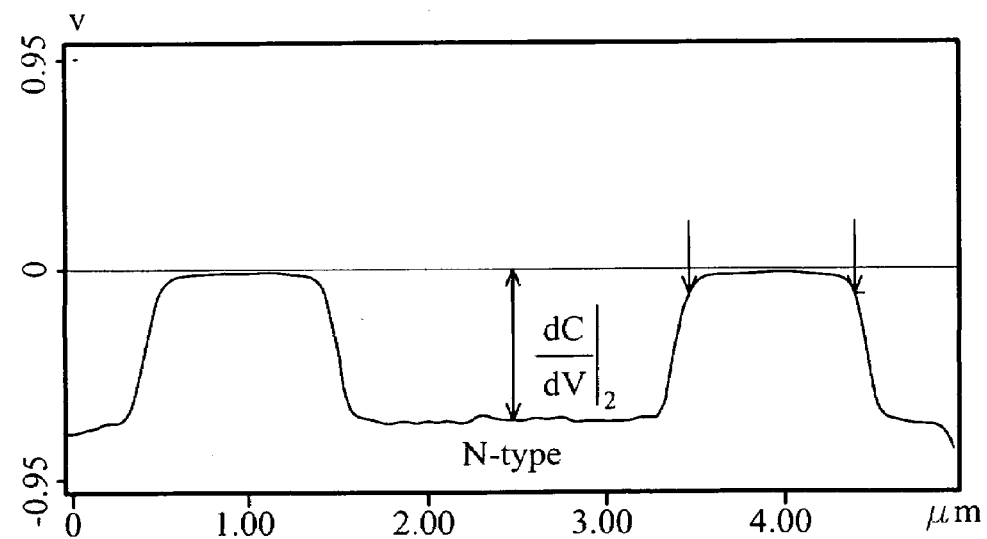

FIGS. 4A and 4B are dC/dV profiles of the low-energy-$BF_2^+$-implanted region acquired by different AFM laser beam setups. In FIG. 4A, the stray light illumination can generate carrier injection, thereby increasing the effective carrier concentration of the scan region, and accordingly reduce the SCM signals $$\left(i.e., \left.\frac{dC}{dV}\right|_1 < \left.\frac{dC}{dV}\right|_2\right)$$

The reduced SCM signals can cause lower contrast images. In accordance with embodiments of the present invention, the scanning probe microscope apparatus is equipped with a long-wavelength laser atomic force microscope to overcome carrier injection and enhance the contrast of dC/dV images of the low-energy-$BF_2^+$-implanted region.

Figure 5A:
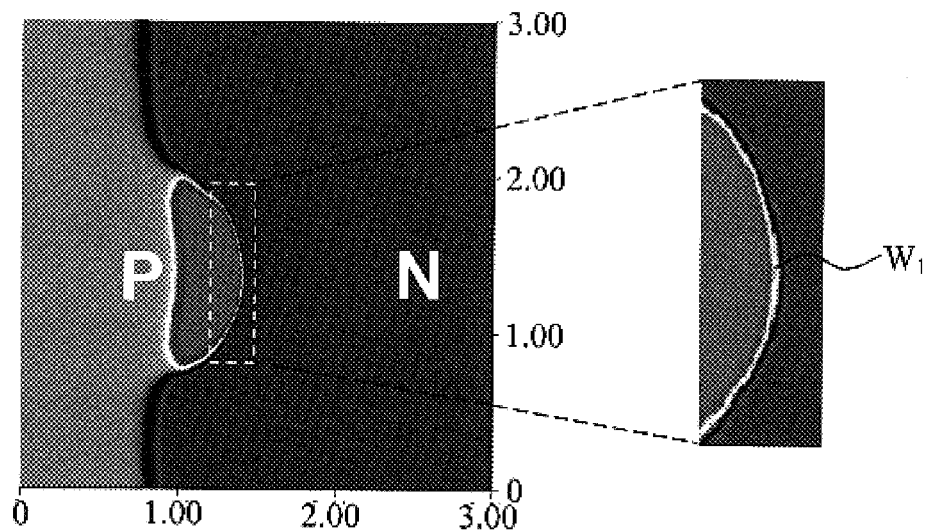
FIGS. 5A and 5B are two-dimensional differential capacitance (dC/dV) images of the low-energy-$BF_2^+$-implanted region with different AFM laser beam setups shown in FIGS. 3B and 3C, respectively.
Figure 5B:
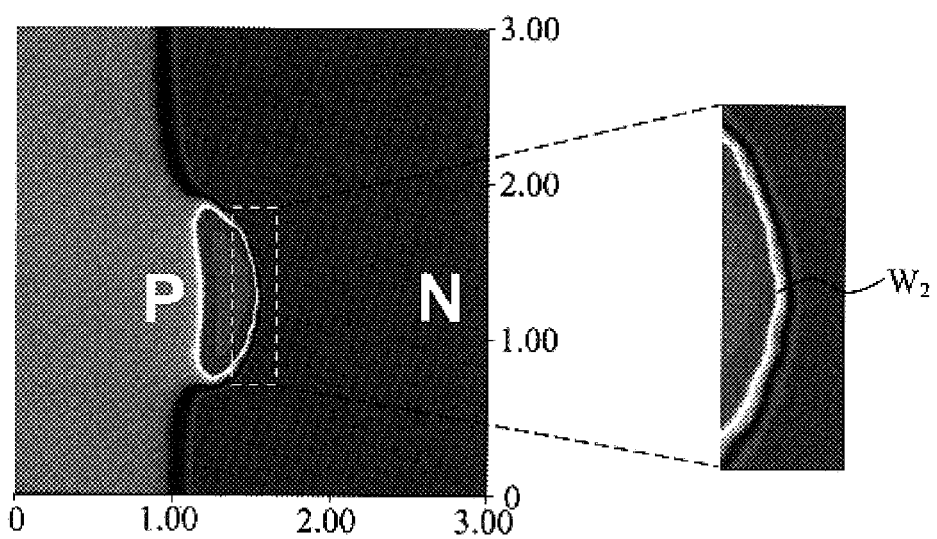

FIGS. 5A and 5B are two-dimensional dC/dV images of the low-energy-$BF_2^+$-implanted region for different AFM laser beam setups. In FIG. 5A, the stray light absorption causes a photovoltaic effect at a junction region, thereby reducing the measured junction width $W_1$ to be less than the junction width $W_2$. The measured deviation induced by photoperturbations can be up to approximately 50%. In accordance with the present invention, the scanning probe microscope apparatus is equipped with a long-wavelength laser atomic force microscope to overcome the photovoltaic effect and acquires accurate two dimensional dC/dV images of the low-energy-$BF_2^+$-implanted region.

Figure 6A:
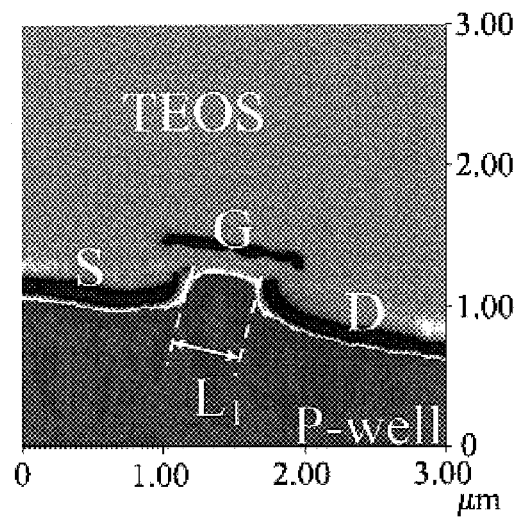
FIGS. 6A and 6B are two-dimensional differential capacitance (dC/dV) images of a MOS device region with different AFM laser beam setups shown in FIGS. 3B and 3C, respectively.
Figure 6B:
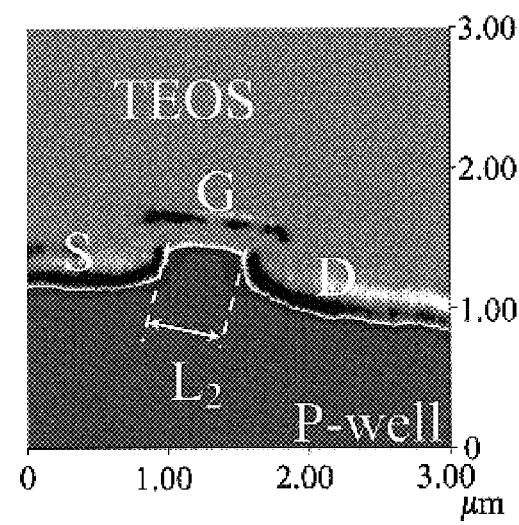

FIGS. 6A and 6B are two-dimensional dC/dV images of a MOS device region for different AFM laser beam setups.

In FIG. 6A, a red laser beam with wavelength of 670 nm generates optical absorption and causes a surface photovoltaic effect and a carrier injection effect, thereby reducing the measured effective channel length $L_1$ to less than the effective channel length $L_2$. The measured deviation induced by photoperturbations can be up to approximately 11.2%. In accordance with the present invention, the scanning probe microscope apparatus equipped with long-wavelength laser atomic force microscope to overcome the photoperturbation effects and acquires accurate effective channel length of the MOS device, as shown in FIG. 6B.

The present invention is illustratively exemplified as a scanning capacitance microscope, although other electrical scanning probe microscopes, such as scanning spreading resistance microscope (SSRM), Kelvin force microscope (KFM) and conductive atomic force microscope (C-AFM) can also be equipped with long wavelength laser AFM according to the present invention.

Figure 7:
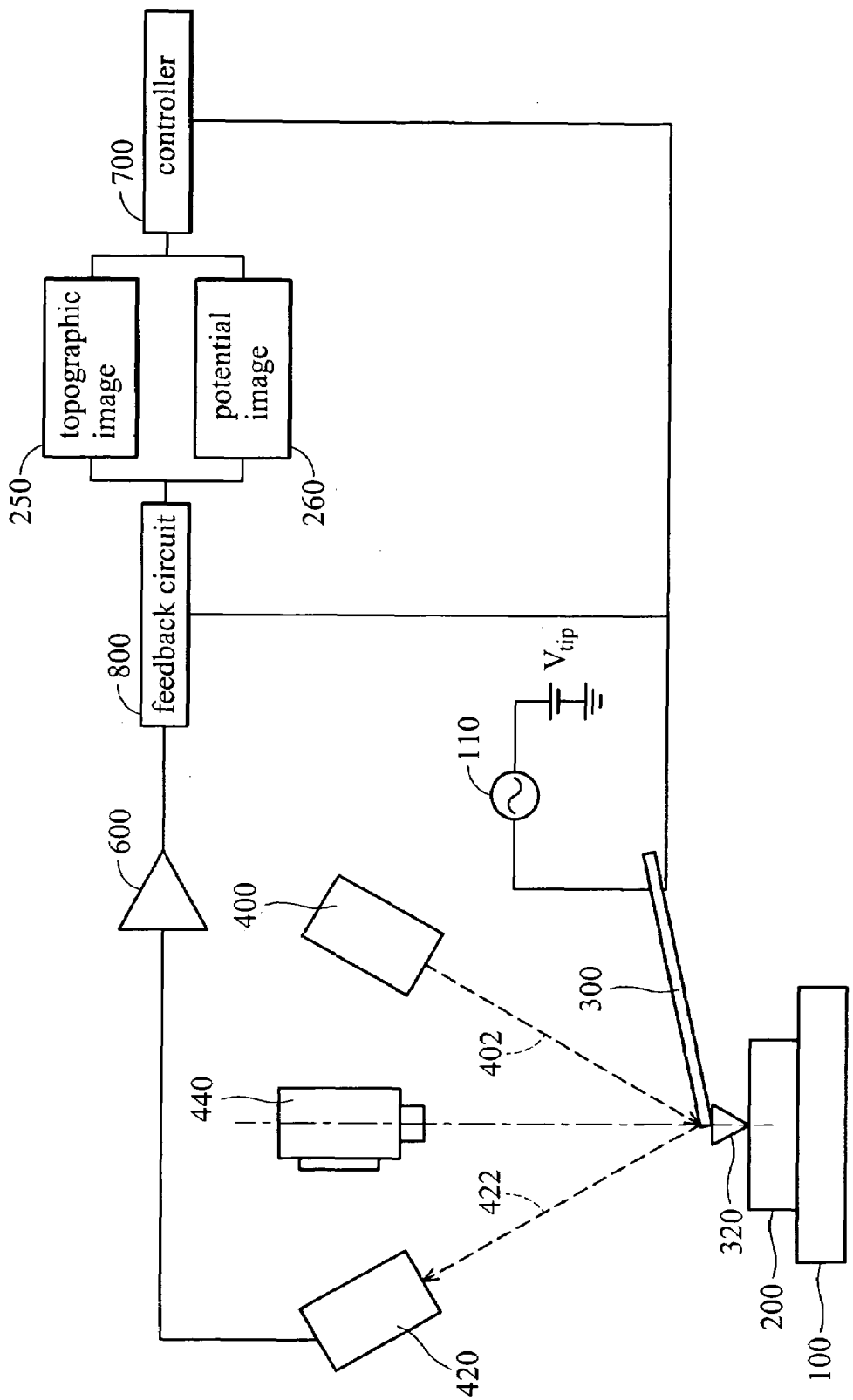
FIG. 7 is schematic view of a Kelvin force microscope (KFM) using a long-wavelength laser beam as a surface potential image measuring setup.

Alternatively, non-contact mode scanning microscopes, such as electrostatic force microscopy (EFM) or Kelvin force microscope (KFM) can also be equipped with a long wavelength laser source and a PIN photodiode sensor. FIG. 7 is schematic view of a Kelvin force microscope (KFM) using a long-wavelength laser beam as a surface potential image measuring setup. Referring to FIG. 7, an electrostatic force microscope (EFM) apparatus comprises a sample stage 100 for supporting a sample 200 and controlling position of the sample 200. A scanning probe device comprises a cantilever 300 and a conductive probe 320. An AC biasing source 110 and a DC bias $V_{tip}$ are operatively coupled to the cantilever 300. The conductive probe 320 moves toward and away from the surface of sample 200 with oscillatory motion, preferably at or near a resonant frequency of the scanning probe device. The conductive probe 320 is operatively coupled to AC biasing source 110. First, a topographic image 250 is taken. Then the probe 320 is retracted a predetermined distance, such as 200 nm from the sample 200 and a potential image 260 is made. The potential image 260 shows the variations of the electrostatic potential in the same sample area.

In the most common configuration, a long-wavelength laser source 400, such as laser diode, generates a laser beam 402 which bounces off the back of the cantilever 300 onto a position-sensitive photo detector (PSPD) 420, such as a PIN photodiode sensor. As the cantilever 300 bends, the position of the laser beam 402 on the detector 420 shifts. A calibration device 440 calibrates the position of the laser beam 402.

Lock-in amplifier 600 demodulates the electrical potential signals at the oscillation frequency, or at some combination of frequency oscillation harmonics, of conductive probe 320, resulting in signals that correspond to the modulation amplitude of the probe-sample electrostatic force. These signals pass to a controller 700, and then pass into an AFM feedback circuit 800 to be stored for each data point with respect to X and Y position on sample 200. Such data may also be passed to a display device (not shown) for display as an image of sample electrical potential image or topographic image.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An electrical scanning probe microscope apparatus, comprising:
    an atomic force microscope with an infrared laser source and a position-sensitive photo-detector (PSPD) to provide a topographic image;
    a charge-coupled device (CCD) monitor for optical alignment; and
    an electrical sensor device operatively coupled to the atomic force microscope to form a synchronous two-dimensional electrical image
    wherein the atomic force microscope comprises:
    a sample stage;
    a scanning probe device comprising a cantilever and a conductive probe at the free end of the cantilever;
    a topographic image device, operatively coupled to the scanning probe device comprising the infrared laser source, the PSPD corresponding to the infrared laser source, and a calibration device for calibrating the infrared laser source; and
    a controller for controlling the position of the scanning probe device.

2. The electrical scanning probe microscope apparatus as claimed in claim 1, wherein the PSPD comprises an InGaAs or a Ge PIN photodiode.

3. The electrical scanning probe microscope apparatus as claimed in claim 1, wherein the wavelength of the infrared laser source is approximately 1.3 µm or 1.55 µm.

4. The electrical scanning probe microscope apparatus as claimed in claim 1, wherein the electrical scanning sensor device comprises a capacitance sensor, a spreading resistance sensor, or a current sensor.

5. An electrostatic force microscope apparatus, comprising:
    an atomic force microscope with an infrared laser source and a position-sensitive photo-detector (PSPD) to provide a topographic image; and
    a charge-coupled device (CCD) monitor for optical alignment;
    wherein a two-dimensional electrical potential image is acquired corresponding to the topographic image, and
    wherein the atomic force microscope comprises:
    a sample stage;
    a scanning probe device comprising a cantilever and a conductive probe at the free end of the cantilever;
    a topographic image device, operatively coupled to the scanning probe device comprising the infrared laser source, the PSPD corresponding to the infrared laser source, and a calibration device for calibrating the infrared laser source; and
    a controller for controlling the position of the scanning probe device.

6. The electrical scanning probe microscope apparatus as claimed in claim 5, wherein the PSPD comprises an InGaAs or a Ge PIN photodiode.

7. The electrostatic force microscope apparatus as claimed in claim 5, wherein the wavelength of the infrared laser source is approximately 1.3 µm or 1.55 µm.

* * * * *